United States Patent [19]

Weiland et al.

[11] 4,292,009
[45] Sep. 29, 1981

[54] HINGELESS ROTOR SYSTEM

[75] Inventors: Emil Weiland, Hohenbrunn; Klaus Brunsch, Weidach, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 970,740

[22] Filed: Dec. 18, 1978

[30] Foreign Application Priority Data

Dec. 24, 1977 [DE] Fed. Rep. of Germany ....... 2758086

[51] Int. Cl.³ .............................................. B64C 27/38
[52] U.S. Cl. .................................. 416/134 A; 416/141
[58] Field of Search ............... 416/134 A, 141, 138 A, 416/230 A, 226, 143

[56] References Cited

U.S. PATENT DOCUMENTS

| | | | |
|---|---|---|---|
| 2,447,118 | 8/1948 | Gluhareff | 416/143 |
| 3,261,407 | 7/1966 | Culver et al. | 416/138 A |
| 3,279,278 | 10/1966 | Eldred | 416/134 A |
| 3,369,610 | 2/1968 | Dancik | 416/143 |
| 3,475,988 | 11/1969 | Atlinger et al. | 416/134 A |
| 3,476,484 | 11/1969 | Brunsch | 416/230 A |
| 3,484,174 | 12/1969 | McCoubrey | 416/138 A |
| 3,606,575 | 2/1969 | Lermusiaux | 416/141 |
| 3,669,566 | 6/1972 | Bourquardet | 416/134 A |
| 3,754,840 | 8/1973 | Zincone et al. | 416/226 |
| 3,797,964 | 3/1974 | Hanson | 416/134 A |
| 3,999,886 | 12/1976 | Ormiston et al. | 416/138 A |
| 4,182,597 | 1/1980 | Derschmidt | 416/141 |

FOREIGN PATENT DOCUMENTS 973587 10/1964 United Kingdom ............... 416/141

Primary Examiner—Everette A. Powell, Jr.
Attorney, Agent, or Firm—W. G. Fasse; D. F. Gould

[57] ABSTRACT

The present hingeless rotor system for helicopters has carrier spars or bars each of which is subdivided into three functional sections substantially forming the blade neck connecting the lift producing portion of the respective rotor blade to the rotor mast. The carrier spar sections form a single structural blade neck member extending for about two tenths of the rotor radius from the rotor mast to the lift producing blade portions. About one half of the length of the blade neck adjacent to the rotor mast form the connecting zone proper. The spar sections comprise bands forming respective loops in the connecting zone proper. Two of the band loops are connected one above the other and a third band loop is displaced in the direction of rotation of the rotor from the first mentioned band loops. The third band loop is releasably connected to the rotor mast to allow a folding of the respective rotor blade. The spar sections are interconnected by shear resistant bridging webs having a T- or X cross-section.

19 Claims, 3 Drawing Figures

4,292,009

HINGELESS ROTOR SYSTEM

BACKGROUND OF THE INVENTION

The invention relates to a hingeless rotor for helicopters wherein the lift producing sections of the rotor blades are connected at their inner ends to a respective intermediate member. The intermediate members are flexible to torsional and bending loads and tension resistant, whereby the intermediate members allow blade angle movements as well as flapping and lead-lag movements. Each intermediate member is secured to the rotor mast or drive shaft connector by a substantially rigid connecting element. Each blade section has a support or carrier bar or spar in common with the respective intermediate member and connecting element. The carrier spar is made of fiber compound material and extends as an integral element from the respective blade section to the rotor mast. The fibers of the carrier spar extend substantially unidirectionally relative to the longitudinal axis of the carrier spar.

Known types of rotor systems having a hingeless flapping and lead-lag blade connection require a special, rigidly constructed rotor head which is attached to the central rotor mast. An example of such a system is disclosed in the German Patent Publication No. 1,531,375. The rotor head of such rotor systems supports each of the rotor blades by means of blade angle bearings so that the rotor blades are rotationally movable. The rotor blades of such systems comprise a lift producing blade portion and a neck portion which is flexible to bending but torsionally resistant. Generally, such rotor systems also comprise additional tensionally resistant laminae connecting the rotor blades at the blade roots to each other in order to compensate for centrifugal force loads, and detachable, pivotally acting fittings arranged between the blade angle bearings and the bending and flexible blade neck portions for folding the rotor blades. Such rotor systems do achieve an exact steering function and a favorable positioning of the so-called fictive flapping hinges in the area of the bending-elastic neck portions and with a comparitively large spacing from the axis of rotation of the rotor. However, such rotor systems have a relatively complicated structure, are produced by a rather complicated method of construction and have a correspondingly large structural weight because of the need for a specially constructed rotor head arrangement with blade angle bearings and possibly with tension members.

In contrast, rotor systems of the type mentioned above at the beginning, an example of which is described in U.S. Pat. No. 3,669,566 do not require a special rotor head nor do they require any blade angle bearings other than the flapping and lead-lag hinges. Each of the lift producing sections of the rotor blades of such rotor systems are connected directly to the rotor mast by means of a support spar which is connected at one end to the rotor mast and the other end of which extends into the lift producing portion of the rotor blade. The support spar comprises a plurality of individual fibers made of fiber compound material. The individual fibers are combined to form an integral structural member connected on one end to the rotor mast and on the other end to the lift producing portion of the rotor blade. The fibers of the support spar in the bending and torsionally elastic region between the rotor mast and the blade section, are spaced from one another and uniformly distributed over the entire cross section of the support spar. In this region the fibers are embedded in an elastomeric material. A folding of the rotor blades of such a rotor system is not possible, however, because of the single piece of integral construction of the support spar extending from the rotor mast into the lift producing portion of the rotor blade. Non-folding rotor blades are disadvantageous, particularly when the rotor blade diameter is large. Besides, the fictive flapping and lead-lag hinges are located unfavorably close to the rotor center because of the small radial spacing of the bending-elastic intermediate region from the axis of rotation of the rotor. Primarily, however, the intermediate region of the support spar is not only elastic to bending and to torsional loads, it is also unstable against shearing loads to a high degree. Consequently, the intermediate blade region of such a rotor system is subject to uncontrollable deformations and transverse displacement of the blade axis due to the effect of transverse forces on the rotor blade, primarily the forces due to lift and air resistance. Such deformations and transverse displacements have a highly disadvantageous effect on the steering or control behavior of the rotor system.

OBJECTS OF THE INVENTION

In view of the foregoing it is the aim of the invention to achieve the following objects singly or in combustion:

to provide a helicopter rotor system which does not require any special rotor head, blade angle bearings, as well as flapping and lead-lag hinges, yet has improved steering characteristics;

to provide a rotor which is shear resistant in the intermediate region of the support spar; and to provide a rotor, which in spite of its simple construction, has a highly accurate, certain and safe steering behavior.

SUMMARY OF THE INVENTION

The helicopter rotor system of the present invention comprises carrier bars or spars each of which is divided in the area of its intermediate member into at least three spar sections which are displaced relative to one another and in the circumferential direction.

The three spar sections are held at a fixed distance from one another by thin wall, substantially shear resistant bridging lands which are connected together to form a shear resistant central member with a substantially open cross section. Due to the fact that the lands have thin walls they are capable of providing the respective bending and torsion elasticity.

Due to the separation of the intermediate carrier spar member into a plurality of spar sections made of fiber compound material strands which extend separately in the radially outer regions of the intermediate member, and since the lands form a shear transfer member arranged radially inwardly between said strands, the rotor system of the present invention achieves an exactly defined bending characteristic and above all, a shear stability in the region of the intermediate member in spite of a low torsional stiffness. This shear transfer member has an open cross section in the shape of a T or a cross. Hence, it is possible to make blade angle adjustments with minimal steering forces. Consequently, the aerodynamic forces effective on the lift producing blade portions or sections during rotation of the rotor are taken up in the form of shearing forces and transferred to the rotor mast. These shearings forces are taken up and transferred without the occurrance of unpermissable shearing deformations of the intermediate member and without uncontrolled displacements of the fictive hinges in the flapping and/or lead-lag planes of the rotor blades. Due to the special construction of the intermediate carrier spar section the rotor system of the present invention has favorable steering characteristics substantially equal to that of conventional rotor systems with a rotor head and blade angle bearings. This favorable steering characteristic is particularly due to the direct connection of the blades to the rotor mast by the carrier spar without any bearings and hinges. However, the present rotor system has a substantially simple structure which is lighter than the above mentioned rotor systems of the prior art.

BRIEF FIGURE DESCRIPTION OF PREFERRED EXAMPLE EMBODIMENTS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
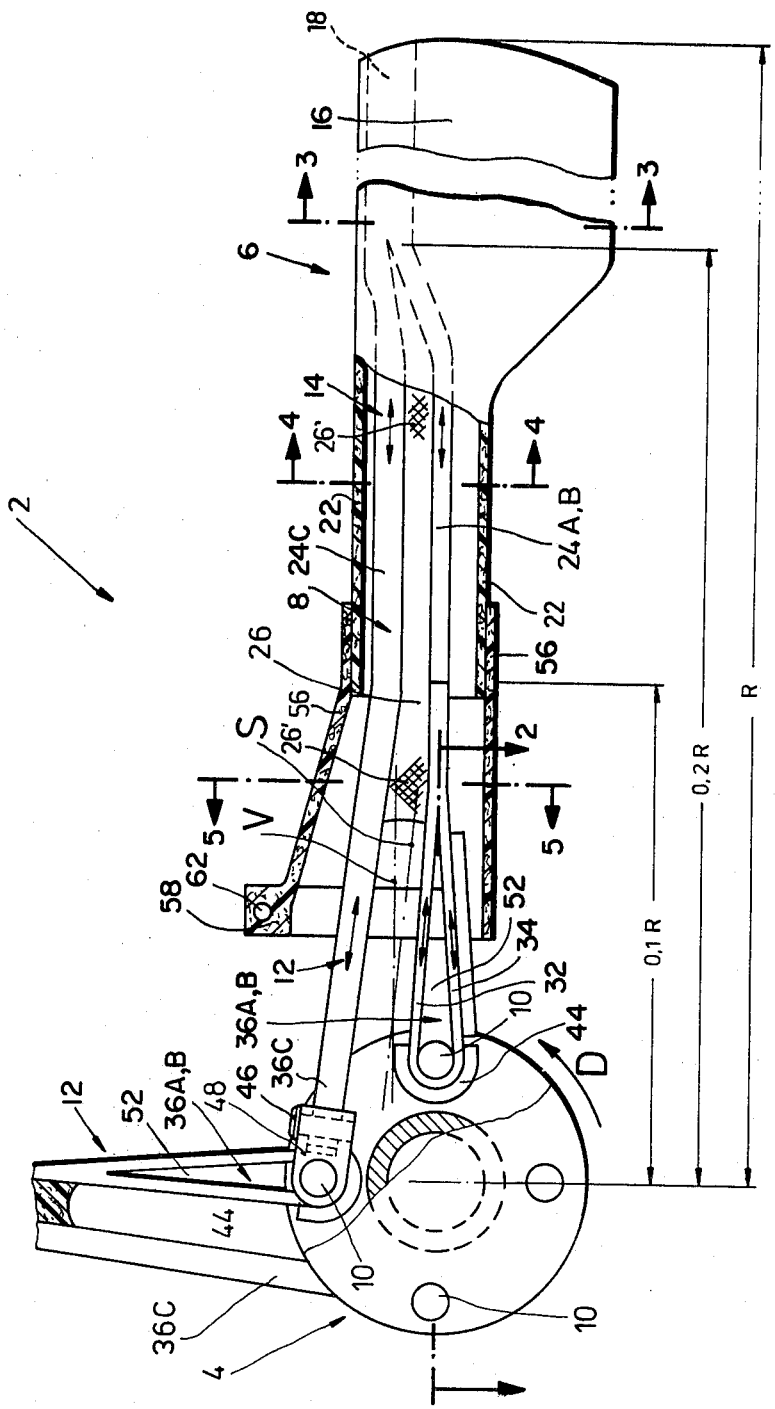
FIG. 1 illustrates schematically a top plan view partially in section of a rotor system constructed in accordance with the invention, wherein, for simplicity's sake, only one rotor blade with the associated carrier spar or bar is illustrated, whereas only the connecting area of a further rotor blade is illustrated showing the connection of the second blade to the rotor mast.
Figure 2:
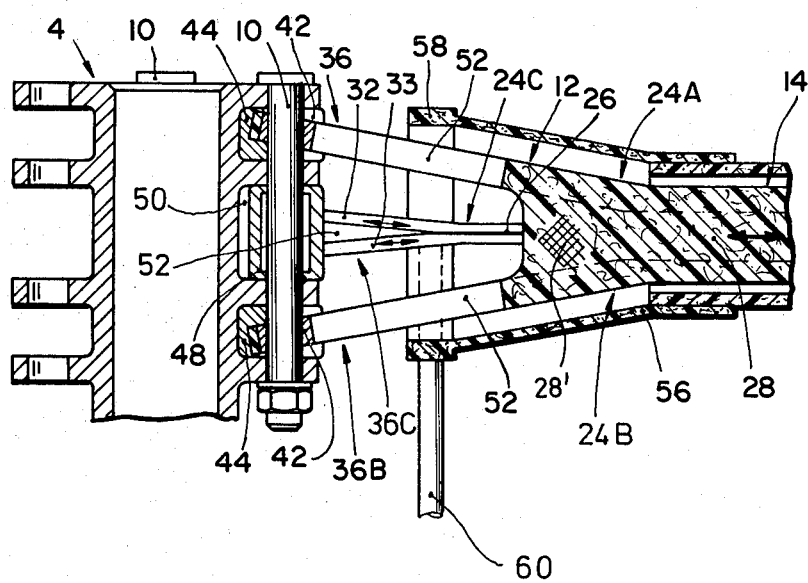
FIG. 2 illustrates schematically a sectional view of a portion of the rotor of FIG. 1 along section line of plane 2—2 in FIG. 1.

FIG. 1 illustrates the major components of a four-blade rotor system 2 according to the present invention. The rotor system 2 comprises a central rotor mast 4 and rotor blades 6. Only one rotor blade is fully shown to the blade tip but with an intermediate portion broken away. The region where the second blade is connected to the rotor mast 4 is also illustrated in FIG. 1, however, for the remaining two blades only the location of the connecting pins is shown. The connection of the rotor blade 6 to the rotor mast 4 is accomplished by means of a carrier spar or bar 8 the components 24A, 24B, and 24C of which are made of fiber compound material the fibers of which extend unidirectionally in the direction of the longitudinal axis of the carrier spar 8. The carrier spar 8 is constructed as an integral member extending from the blade tip to the rotor mast. The longitudinal arrows in FIGS. 1 and 2 illustrate the direction in which the fibers of the spar 8 extend.

Figure 3:
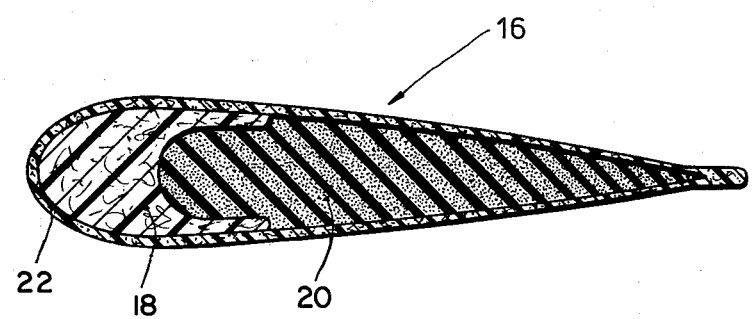
FIG. 3 illustrates a schematical sectional view of the rotor blade portion of FIG. 1 along section line 3—3 in FIG. 1.

The spar 8 is subdivided into several functional regions, each of which has a different construction. The first functional region comprises a very rigid connecting member 12 secured to the rotor mast 4 by connecting bolts 10. The connecting member 12 extends about one-tenth of the rotor radius R toward the blade tip. The second functional region comprises an intermediate member 14 which is secured to the connecting member 12. The intermediate member 14 is elastic relative to torsional and bending loads; however, it is capable of transferring shearing forces. The intermediate member 14 extends about two-tenths of the rotor radius R toward the blade tip. The third functional region as seen in FIG. 3 comprises a solid outer member 18 substantially in the cross-sectional shape of a sickle (FIG. 3) and extending from the intermediate member 14 along the leading edge of the lift producing blade portion 16 of the rotor blade 6. Both, the sickle-shaped outer member 18 and a supporting core 20 made of a foam material are enclosed by a thin walled torsion casing 22. The torsion casing 22 is made of fiber compound material wherein the fibers extend in directions intersecting substantially in the wing span direction at an angle of about ±45°. The outer member 18, the foam material supporting core 20, and the torsion casing 22 make up the airfoil profile in the region of the lift producing blade portion 16.

The intermediate member 14 of the carrier spar 8 has as low a torsion resistance as possible in order to allow blade angle adjusting movements of the blade portion 16 requiring only small steering forces. The intermediate member 14 also has a definite bending elasticity in the flapping direction and in the lead-lag direction thus having an effect corresponding to the fictive flapping and lead-lag hinges. In addition, the intermediate member 14 is capable of transferring the shearing forces acting on the blade portion 16 in the flapping and lead-lag directions to the torsionally and bending resistant connecting member 12, and hence to the rotor mast 4. These forces are transferred without undue, undefined deformations and without any corresponding displacements of the fictive hinges. For accomplishing these steering functions the end of the spar 8 near the rotor mast is divided, according to the invention, into several spar sections, for example, three spar sections 24A, 24B, and 24C. Otherwise, the spar 8 is rigid along its outer member 18.

Figure 4:
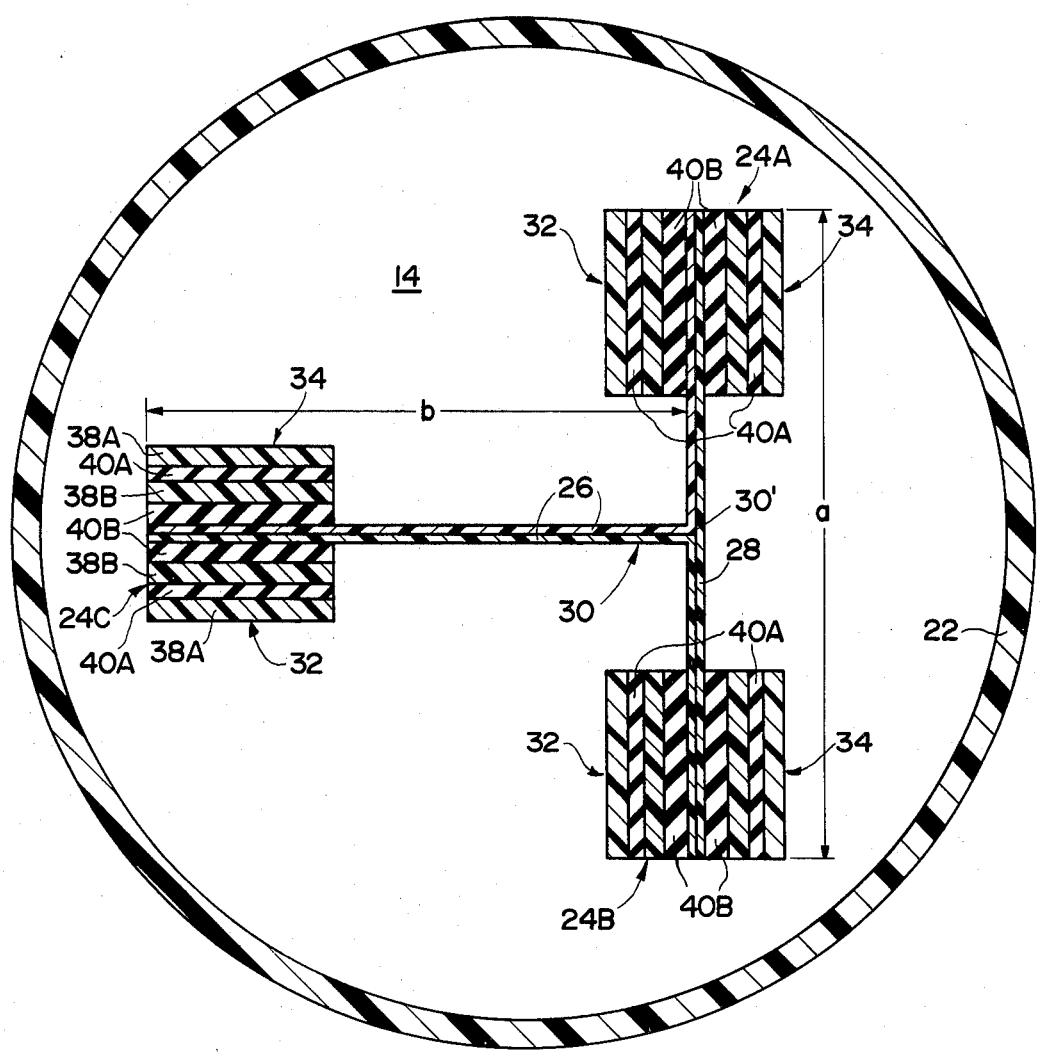
FIG. 4 illustrates on an enlarged scale relative to FIG. 1, a sectional view through the carrier spar or bar of the rotor of FIG. 1 along section line or plane 4—4 in FIG. 1 in the region of the intermediate member.
Figure 5:
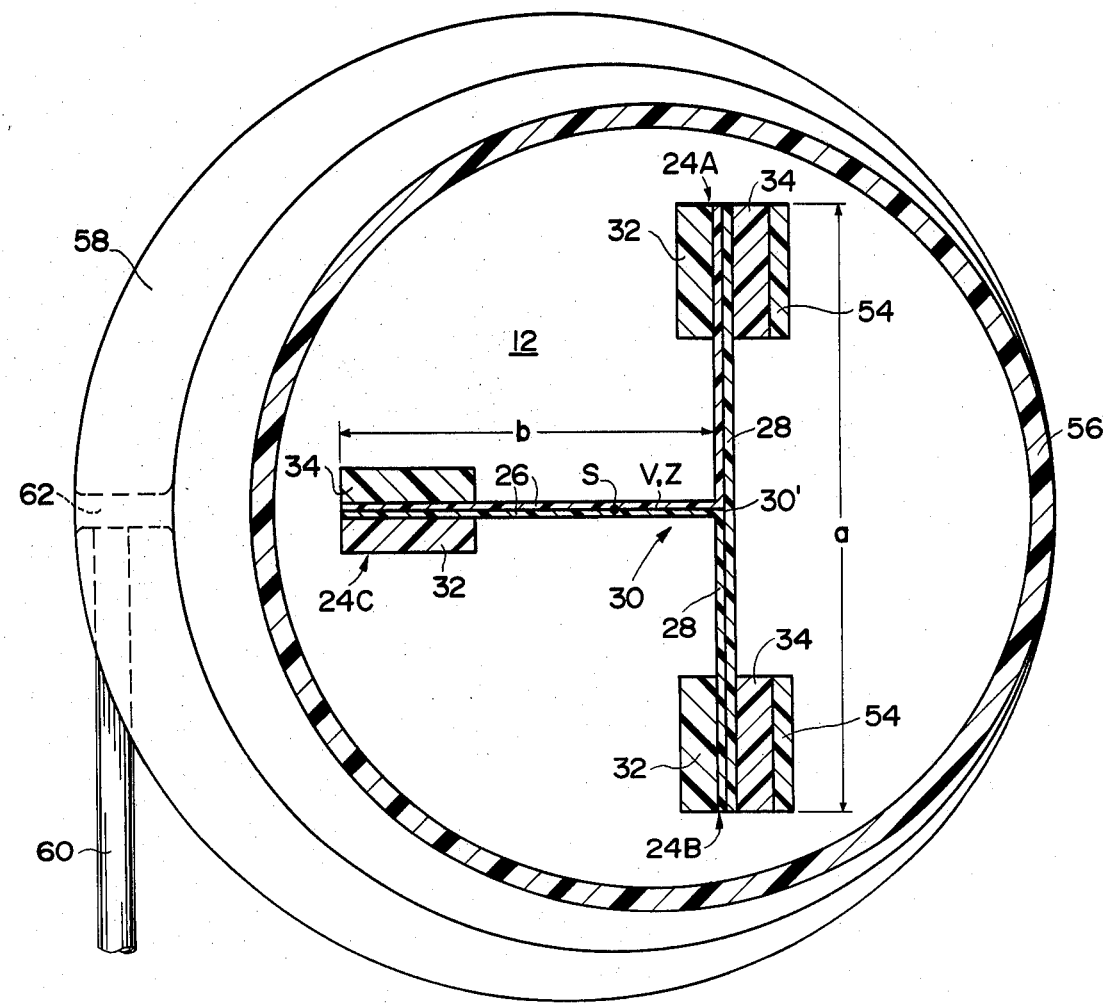
FIG. 5 illustrates on an enlarged scale relative to FIG. 1, a schematic section through the connecting member along section line or plane 5—5 in FIG. 1.

FIG. 1 shows in dashed lines that, in the transition zone between the intermediate member 14 and the outer member 18, the spar sections 24A, 24B, and 24C diverge radially inwardly along a short transitional zone near the radially inner end of the outer member 18, and then extend with parallel spacing from one another substantially along the length of the intermediate member 14 to the connecting member 12. The two spar sections 24A and 24B are arranged one above the other in the flapping direction as illustrated in FIGS. 5 and 6. The remaining spar section 24C is arranged offset relative to the spar sections 24A, 24B toward the leading edge of the rotor blade 6 in the direction D of rotation of the rotor blades and in a plane extending about centrally between the spar sections 24A and 24B. FIG. 1 further shows that, in the transition zone between the intermediate member 14 and the connecting member 12, the spar section 24C diverges in the rotational plane toward its respective connecting bolt 10. FIG. 2 on the other hand shows that in the transition zone between the intermediate member 14 and the connecting member 12, the spar section 24A and 24B diverge in a vertical plane toward their common connecting bolt 10. Thin-walled, shearing resistant bridging lands or webs 26, 28 are cemented between the spar sections 24A, 24B, and 24C. The bridging lands or webs are made of fiber compound material with the fibers intersecting the longitudinal direction of the bridging lands or webs at about ±45° as illustrated in FIG. 1 by the localized cross hatching 26' and in FIG. 2 by the localized cross hatching 28'. The horizontal web 26 is arranged in the plane of rotation of the rotor blades and the vertical web 28 is arranged parallel to the axis of rotation or vertically in the flapping direction as most clearly seen in FIG. 4. The horizontal web 26 and the vertical web 28 are connected together as a result of the curing of said compound material in a mold to form a central member 30 with a T-shaped outwardly cross-section which transfers shearing forces or loads.

An "outwardly open" cross-section is intended to define a central member 30, the webs 26, 28 of which extend radially outwardly from a connecting line or point 30' of the webs 26, 28, whereby the outer, free edges of these webs are not interconnected. The spar sections 24A, 24B, 24C are connected to these outer free edges of the webs as a result of the curing of the fiber compound material.

The T-shaped cross-section of the central member 30 is particularly suitable for spar constructions with three spar sections 24A, 24B, 24C as in the present example embodiment. However, other cross-sectional shapes may be chosen for the central member 30 with webs for transferring shearing forces in the flapping and lead-lag directions. For example, an open substantially ray or star shaped or x-shaped configuration of the web arrangement may be used for more than three spar sections forming a different spar section arrangement.

Each spar section 24A, 24B, and 24C comprises two belt halves 32 and 34. One belt 32 extends, starting at the outer member 18 of the support spar 8, on one side of the respective shear resistant web 26 or 28 through to the rotor mast 4. At the rotor mast 4, the belt half 32 forms a belt loop 36A, 36B or 36C, (FIGS. 1 and 2) and then extends as belt half 34 on the other side of the respective web 26 or 28 once again into the outer member 18 of the carrier spar 8. In the area of the intermediate member 14 each belt half 32, 34, is further divided into several belt sections 38A, 38B as shown in FIG. 4, see especially the spar section 24C. Thus, the elastomeric layers 40A, 40B are shown in FIG. 4, but not in FIG. 5. The individual belt sections 38A and 38B are cemented to each other and to the web 26 or 28 arranged between the belt sections by thin intermediate cementing or adhesive layers 40A or 40B of elastomeric material. The individual belt sections 38A and 38B have an elongated rectangular cross-section with a substantially larger cross-sectional height than the cross-sectional width whereby the center planes of the belt cross-sections in the cross-sectional height extend parallel to or substantially in the plane of the respective web 26 or 28.

The web heights "a" and "b" in the intermediate member 14 are chosen with consideration of the cross-sectional shape and arrangement of the spar sections 24A, 24B, 24C or belt sections and with regard to the elastomeric intermediate layers 40A and 40B, so that the intermediate member 14 also has a definite, small resistance to bending in the flapping and in the lead-lag direction, in addition to a low resistance to torsional loads. The web heights "a", "b" are also chosen so that the intermediate member 14 has at the same time a definite form stability against the shearing forces acting on the blade portion 16 during rotation of the blades. This form stability of the intermediate member 14 causes these shearing forces to be transmitted, in the form of shearing loads on the central member 30 comprising the webs 26 and 28, by the intermediate member 14 to the connecting member 12 without uncontrolled deformations of the intermediate member 14. The elastomeric layers 40A and 40B, which allow a displacing or shear movement of the individual belt sections 38A and 38B, are present only in the area of the intermediate member 14 where the individual belt sections 24A, 24B and 24C extend parallel to one another.

Accordingly, both belt halves 32, 34 are again constructed as single piece fiber compound strands with a unidirectional fiber direction in the area of the connecting member 12. The one piece fiber compound belt halves 32, 34 are firmly cemented to the outer edges of the webs 26 or 28 which extend into the connecting member 12 to a point where the belt loops 36 begin as seen in FIG. 2. The web heights "a" and "b" or the mutual spacing between the spar sections 24A, 24B and 24C increases continually along the connecting member 12 toward the rotor mast 4.

FIG. 2 shows most clearly that both of the belt loops 36A and 36B, arranged one above the other in the flapping direction, are secured by a common connecting bolt 10 extending parallel to the axis of rotation of the rotor. This connection of each belt loop 36A and 36B includes a connecting sleeve 42 arranged between the inner face of the belt loop 36A or 36B and the connecting bolt 10, and an outer support bushing 44 enclosing the outer face of the belt loop 36A or 36B. The support bushing 44 supports the belt loop 36A or 36B at the rotor mast 4 in the instance of compressive loading. The belt loop 36C, on the other hand, as seen in FIG. 1, is rotated by 90° relative to the belt loops 36A and 36B and is displaced toward the leading edge in the direction D of rotation. The belt loop 36C is secured by a releasable secondary bolt 46 (FIG. 1) and a fitting member 48, enclosing the outside of the belt loop 36C, to the connecting bolt 10 of of the neighboring rotor blade 6 as viewed in the direction D of rotation. This fitting member 48 sits in a recess 50 of the rotor mast 4 arranged between the belt loops 36A and 36B. The associated rotor blade 6 may be brought into a folded condition by removal of the secondary bolt 46, whereby the connecting bolt 10 acts as a journal axis. Wedge shaped filler members 52, for example made of foam material, are cemented in the loop area between the two belt halves 32, 34 of each loop 36A, 36B and 36C. The wedge shaped filler members 52 extend from the connecting sleeve 42 or from the secondary bolt 46 to the radially inner end of the shear resistant webs 26 and 28.

The tension force resulting from the air resistance and the centrifugal force acting on the rotor under rated operating conditions, is shown in FIG. 1 by a dash-dotted line of action V for a typical rotor system. In order that this resultant tension force does not cause any deformations in the lead-lag direction in the connecting member 12, it is necessary that all of the fibers of the spar sections 24A, 24B, and 24C are subjected to equal tension loading by said resultant force. In other words, in each cross-section of the connecting member 12 the central point Z of the tension loading must coincide with the line of action V of the resultant tension force. This line of action V does not lie in the line connecting the areal centers of gravity S defined by the cross-sectional geometry of the connecting member 12. Therefore, the central point Z of the tension loading in the area of the connecting member 12, is shifted from the areal center of gravity S to coincide with the line of action V of the tension force. Such shifting is accomplished by the addition of fiber portions having a different elasticity modulus, to the belt halves 32, 34 of the individual spar sections 24. These additional fiber portions 54 are cemented onto the belt halves 34A and 34B of the spar sections 24A and 24B as illustrated in the cross-sectional view of the connecting member 12 in FIG. 5. The fibers of the additional fiber portion 54 also extend unidirectionally and have a considerably higher elasticity modulus than the fibers of the spar section 24. For example, the additional fiber portions 54 may comprise carbon fibers where the spar section 24 is constructed of glass fibers.

Additional dynamic alternating bending loads are caused by the flapping and lead-lag movements of the rotor blades. These additional dynamic bending loads occur along the connecting member 12 and increase toward the axis of rotation of the rotor. These additional dynamic alternating bending loads are superimposed on the static components of the forces due to air resistance and centrifugal forces effective on the blade section 16. The spacing distances "a" and "b" between the spar sections 24A, 24B, and 24C are increased along the connecting member 12 to such an extent that the combined loads resulting from the static load components and from the dynamic bending loads effective on each spar section are substantially only in the form of tension loads in most load instances. Whereas, individual spar sections are loaded by compressive forces only when the rotor does not rotate, during autorotation, or in the instance of a negative load factor. In such instances, the compressive forces are transferred to the rotor mast 4 by the support bushings 44 or by the fitting member 48.

Thus, the shifting of the central line of tension loading of the connecting member 12 so that it coincides with the line of action V, and a corresponding increase of the spacings "a", "b" between the spar members 24A, 24B, and 24C in the area of the connecting member 12, result in the most efficient construction of the connecting element 12 as far as load application and material utilization are concerned. Consequently, the connecting member 12 remains highly rigid under the effective static and dynamic loads, even for an axial length of the connecting member 12 up to about 10% of the rotor radius R. This construction of the connecting member 12 also guarantees a rigid securing of the intermediate member 14 to the rotor mast 4 with substantially no deforming in the flapping and the lead-lag directions.

A tubular member 56, which is resistant to bending and above all, resistant to torsional loads, is connected to the torsion casing 22 and through this casing 22 to the radially inner end of the blade portion 16 for the purpose of blade angle steering or control. The tubular member 56 is also made of fiber compound material with fiber directions intersecting at about ±45°. The tubular member 56 and its extension in the form of the casing 22 envelope the intermediate member 14 and the connecting member 12 with such a large spacing that the tubular member 56 does not contact the spar sections 24 along the entire torsion and bending range of the intermediate member 14. A conventional steering rod 60 for blade angle steering is pivotally connected to the radially inner end 58 of the tubular member 56. The axial length of the tubular member 56 and the lateral spacing between the connecting point 62 of the steering rod 60 and the central axis of the tubular member 56, or the axis of blade angle rotation defined by the torsion axis of the intermediate member 14, are so dimensioned, that a bending of the intermediate member 14 causes a reverse blade angle steering effect. This reverse steering effect increases proportionately to an increase in the distance by which the tubular member 56 extends beyond the intermediate member 14 toward the axis of rotation of the rotor. The reverse steering effect also increases proportionately to a decrease in the lateral spacing in the direction D of blade rotation, between the connecting point 62 of the steering rod 60 and the axis of blade angle rotation.

The above mentioned elastomeric layer 40B between the web 26, 28 and the spar section 24A, etc. allows movements between the spar section and the web, whereby particularly the torsional rigidity of the intermediate member 14 and hence the occuring forced bending loads on the intermediate member 14 are further reduced.

Since, as mentioned, the webs 26, 28 are preferably made of fiber compound material with a fiber direction intersecting the longitudinal direction of the respective web at an angle of about ±45°, a high resistance to shearing loads is assured in the direction of the surface extension of the web. Another advantage of the invention is seen in that constructing the central shearing loads transferring portion 30 of the intermediate member of the same material as the longitudinally extending carrier spar, results in a lightweight structure.

It is recommended that the connecting member 12 should extend for about one tenth (0.1 R) of the distance R between the axis of rotation of the rotor and the tip of the blade 16. The intermediate member 14 located radially outwardly adjacent to the connecting member 12 should preferably extend from about 0.1 R to about 2/10 of 0.2 R. The lengths assure a favorable position of the fictive flapping and lead-lag hinges defined by the intermediate member 14, whereby these hinges have a desired relatively large radial spacing from the axis of rotation of the rotor.

The webs 26, 28 preferably extend along the connecting member R toward the rotor mast and are rigidly connected to the spar sections 24A, 24B, 24C, whereby a particularly simple, highly strong, and highly rigid construction of the connecting member 12 as accomplished, expecially if the connection between the spar sections and the webs is resistant against relative displacement.

Yet another particularly advantageous feature of a rotor system constructed in accordance with the present invention, is seen in that the center line Z of the tension forces in the connecting member 12 coincides substantially with the force resultant V of the centrifugal force and the force due to air resistance during operation of the rotor under rated conditions, which force resultant V acts on the center of gravity S of the rotor blades 6. This special construction of the connecting member 12 assures that all of the fibers over the entire cross section of the spar section along the connecting member 12 are stretched equally when subjected to the static load portion resulting from the centrifugal force and the air resistance. This equal loading of the fibers of the connecting member 12 avoids deformations of the connecting member 12 in the lead-lag direction. It may occur, that because of structural reasons, the center of gravity S of the cross section of the spar sections 24A, 24B, 24C in the region of the connecting member 12 does not coincide with the effective line of force or line of action V resulting from the centrifugal force and the air resistance. In this instance, the individual spar sections 24A, 24B, 24C are preferably made stiffer in the region of the connecting member 12 by means of additional fiber components having a higher elasticity modulus than the remaining fibers of the spar section as described above. This construction of the spar section allows the positioning of the center line Z of the tension loading to be affected in such a way that it coincides with the effective line or line of action V of the static loading components.

As mentioned, it is another advantage of the invention that the spar sections, due to the construction as disclosed herein, are substantially free of compressive loads in operation, except when the rotor does not rotate or similar situations which do not affect the rotor.

Making the spar sections 24A, 24B, and 24C in the region of the intermediate member 14 from a plurality of belt sections 38A, 38B which are connected to each other by means of elastomeric layers 40A further reduces the torsional stiffness of the intermediate member 14, because when the intermediate member is under torsional loading the forced bending loads in each individual spar section are reduced.

By making the spar sections higher than wider and by locating the spar sections with their height substantially in parallel to the respective web 26, 28, it is possible to further reduce the torsional resistance of the intermediate member 14 without noticeably changing the required bending elasticity and the shearing resistance of the intermediate member.

The arrangement of the bolts 10 and 46, with the latter bolt releasable, makes it possible, for example, to fold the four blades into a two blade fold arrangement in spite of the single piece construction of the support spars.

Another advantage of the present rotor system is seen in that a particularly suitable functional, geometric arrangement of the belt loops 36A, 36B, 36C and a simple connection of the belt loops to the rotor mast 4 is attained. For this purpose, at least two loops 36A, 36B are arranged one above the other in the direction of the axis of rotation of the rotor 4 and attached to the rotor mast by means of a common connecting bolt 10 extending parallel to the axis of rotation of the rotor 4. At least one additional belt loop 36C is arranged in front of the just mentioned belt loops 36A, 36B relative to the direction of rotation D of the rotor. This additional band loop 36C is connected to the rotor mast by means of a secondary bolt 46 extending parallel to the plane of rotation of the rotor, whereby a very simple structure of the pivot fitting is obtained by a removable construction of the secondary bolt 46 allowing the above mentioned folding of the rotor blades.

In this instance, each of the secondary bolts 46 are secured to the rotor mast by means of a fitting member 48 attached to the securing bolt 10 for the neighboring connecting member 12 in the direction of rotation D of the rotor. This fitting member 48 is arranged between the belt loops, situated one above the other, of the neighboring connecting member. This arrangement for connecting the secondary bolts results in a very space conserving bolt arrangement with few force introducing points on the rotor mast.

Although the individual spar sections of the present spars are loaded by compressive forces only during few exceptional instances, such as standstill, autorotation, or when a negative load factor applies, it is advisable that the outside of each of the band loops is enveloped in a supporting bushing sleeve 44, 48 or the like for transferring these compressive forces to the rotor mast to avoid local damage of the fiber compound in the loop region by compressive force loading during these few exceptional instances.

The invention achieves an advantageous steering characteristic of the present rotor system by the use of a torsionally stiff hollow or tubular member 56 for the blade angle steering. The hollow member 56 surrounds the intermediate member 14 and to some extent also the connecting member 12 with an all around spacing. The member 56 is secured by conventional means, to the radially inner end of the blade casing 22 and has a protruding portion 58 to which the steering rod 60 is connected for effecting a blade angle adjustment. This construction assures an exact blade angle adjustment even for larger spacings between the steering rod 60 and the radially inner end of the rotor blade section or casing 22.

As mentioned above, the radius of the protruding portion 58 and the axial length of the tubular member 56 are so selected that a bending of the intermediate member 14 in the flapping direction results in a reset steering of the blade angle when the blade is adjusted in its blade angle. Thus, the bending of the support spar in the area of the intermediate member 14 is utilized in a simple manner to improve the steering characteristic of the rotor. The reverse steering effect may be varied as described above as a function of the dimensions chosen for the axial length of the tubular member 56 and the lateral spacing between the steering rod connecting point 62 and the central axis of the rotor blade or of the tubular member.

Although the invention has been described with reference to specific example embodiment, it is to be understood that it is intended to cover all modifications and equivalents within the scope of the appended claims.

What is claimed is:

1. A hingeless rotor system, especially for helicopters, comprising rotor mast means including an axis of rotation, rotor blade means having a radially inner end and a radially outer tip, and securing means connecting said radially inner end of said rotor blade means to said rotor mast means, said securing means comprising an integral carrier spar means of fiber compound material extending from said rotor mast means completely into said rotor blade means proper, said fiber compound material including fibers extending unidirectionally in the longitudinal direction of said rotor blade means, said integral carrier spar means including a substantially rigid connecting member (12) adjacent to said rotor mast means (4) for connection to said rotor mast means and an intermediate member (14) between said connecting member (12) and said radially inner end of said rotor blade means, said intermediate member (14) being resistant to tensile loads and comprising at least three spar sections (24A, 24B, 24C) and shear resistant web means (26, 28) operatively interconnecting said spar sections (24A, 24B, 24C) so that the spar sections are circumferentially spaced from each other by said web means, said shear resistant web means being dimensioned in the vertical direction (a) and in the horizontal direction (b) so that said intermediate member (14) is flexible relative to torsion and bending loads to form fictive hinge means, said web means (26, 28) forming a central member (30) having an outwardly open cross-section in which the web means are interconnected along a connecting line and the outer free edges of the web means are connected to the spar sections.

2. The rotor structure of claim 1, further comprising elastomeric layer means operatively interposed between said web means (26, 28) and the respective spar sections in said intermediate member (14).

3. The rotor system of claim 1, wherein said web means have a longitudinal axis and comprise fiber compound material the fibers of which intersect said longitudinal axis at an angle of about ±45°.

4. The rotor system of claim 1, wherein said web means (26, 28) extend along said connecting member (12) toward said rotor mast means, said system further comprising means rigidly connecting said web means to said spar sections to prevent relative displacement therebetween.

5. The rotor system of claim 1, wherein said connecting member (12) comprises a central line (Z) along which tension loads are effective, said blade means having a center of gravity line (S) and a resultant line (V) along which a force resulting from the centrifugal force and from the air resistance force is effective, said central line (Z) substantially coinciding with said resultant line (V) which is substantially effective in said center of gravity line (S) so that all three lines substantially coincide.

6. The rotor system of claim 1, wherein individual ones of said spar sections comprise additional fiber components (54) in the region of said connecting member (12) for stiffening the respective spar section, said additional fiber components having a modulus of elasticity higher than that of the fibers of said fiber compound material.

7. The rotor system of claim 1, wherein said spar sections (24A, 24B, 24C) extend into said connecting member (12), said system further comprising means spacing said spar sections from one another so that the spacing increases from said intermediate member toward said rotor mast means, said spar sections being subject substantially only to tensile loads under rated operating conditions of the rotor system.

8. The rotor system of claim 1, wherein said spar sections comprise a plurality of belt elements (38A, 38B) in the region of said intermediate member (14), and elastomeric layer means (40A) operatively interconnecting said belt elements (38A, 38B).

9. The rotor system of claim 1, wherein said spar sections have a given width and a height larger than said given width, and wherein said spar section height extends substantially in parallel to the respective web means (26, 28).

10. The rotor system of claim 1, wherein each of said spar sections comprises at least one longitudinal belt means (36A, 36B, 36C) extending from said radially outer tip of the blade means to the rotor mast means and back to said tip whereby the belt means form a loop.

11. The rotor system of claim 9, further comprising journal fitting means (10) operatively securing said belt loop to said rotor mast, said journal fitting means being adapted for folding the respective rotor blade means.

12. The rotor system of claim 10 or 11, wherein two of said loop forming belt means (36A and 36B) are spaced one above the other, said journal fitting means comprising connecting bolt means extending in parallel to the rotor mast means and connecting said two loop forming belt means to said rotor mast means, said rotor system further comprising at least one further loop forming belt means and auxiliary means (46, 48) securing said further loop forming belt means to said rotor mast means at a point located ahead of said journal fitting means of the corresponding two loop forming belt means as viewed in the direction of rotor rotation, said auxiliary securing means comprising secondary bolt means (46) extending substantially in a plane parallel to the plane of rotor rotation.

13. The rotor system of claim 12, wherein said secondary bolt means is releasable for folding of the respective rotor blade means.

14. The rotor system of claim 12, wherein said auxiliary securing means comprise a fitting member (48) connected to the rotor mast means by the connecting bolt means (10) of the neighboring connecting member (12) located ahead as viewed in the direction of rotor rotation, said fitting member (48) being positioned between the two spaced loop forming belt means of said neighboring connecting member (12).

15. The rotor system of claim 10, further comprising support bushing means (44) arranged to receive the respective belt loop (36A, 36B, 36C) on the outside thereof for transferring any compressive force from the belt loop to the rotor mast.

16. The rotor system of claim 1, comprising a radius (R) of given length extending from said axis of rotation to said radially outer blade tip, said connecting member (12) and said intermediate member 14 each having a length corresponding to about 0.1·R whereby said intermediate member extends to about 0.2·R in the radial direction from said rotor mast.

17. The rotor system of claim 1, further comprising tubular blade angle control means (56) resistant against torsion loads, said intermediate member (14) extending through said tubular blade angle control means with a spacing between the intermediate member and the tubular blade angle control means, said tubular blade angle control means having a radially outer end rigidly secured to the respective rotor blade means proper and a radially inner end, and control rod means (60) operatively secured to said radially inner end of said tubular blade angle control means.

18. The rotor system of claim 17, wherein said radially inner end of said tubular blade angle control means comprise a flange extension (58) providing a connecting point (62) for said control rod means (60), said rotor blade means proper having a longitudinal blade axis about which said rotor blade means are adjustable by said blade angle control means, said connecting point (62) being spaced from said longitudinal blade axis by given spacing, said tubular blade angle control means having a given axial length, said given spacing and said axial length being selected so that a deflection of the respective rotor blade means proper and a bending of the intermediate member (14) result in a blade angle resetting control force.

19. The rotor system of claim 18, wherein said given spacing is within the range of 115 mm to 145 mm, and wherein said axial length of said tubular blade angle control means is within the range of 680 mm to 770 mm, for a rotor of about 10 m diameter (that means about 15% of Rotor Diameter).

* * * * *